United States Patent
Solorenko et al.

(10) Patent No.: US 6,808,455 B1
(45) Date of Patent: Oct. 26, 2004

(54) TORSIONAL SHOCK ABSORBER FOR A DRILL STRING

(76) Inventors: Michael Solorenko, 82 Athabascan Avenue, Sherwood Park, Alberta (CA), T8A 5T1; Robert G. Miller, 244 Prominence Heights S.W., Calgary, Alberta (CA), T3H 2Z6

( * ) Notice: Subject to any disclaimer, the term of this patent is extended or adjusted under 35 U.S.C. 154(b) by 0 days.

(21) Appl. No.: 09/563,330

(22) Filed: May 3, 2000

(51) Int. Cl.[7] ............................................. F16D 17/02
(52) U.S. Cl. ........................... 464/20; 464/76; 464/83
(58) Field of Search ........................ 464/20, 76, 74, 464/83, 85

(56) References Cited

U.S. PATENT DOCUMENTS

| | | | |
|---|---|---|---|
| 1,671,436 A | | 5/1928 | Melott |
| 3,183,684 A | | 5/1965 | Zeidler |
| 3,232,362 A | | 2/1966 | Cullen et al. |
| 3,746,330 A | | 7/1973 | Taciuk |
| 3,779,040 A | | 12/1973 | Garrett |
| 3,866,746 A | * | 2/1975 | Curington ............... 464/18 |
| 3,933,012 A | | 1/1976 | Ketchum |
| 3,939,670 A | | 2/1976 | Amtsberg |
| 4,106,779 A | * | 8/1978 | Zabcik ................... 464/18 |
| 4,139,994 A | | 2/1979 | Alther |
| 4,571,215 A | | 2/1986 | Hansen |
| 4,627,885 A | | 12/1986 | Arlt |
| 4,779,852 A | * | 10/1988 | Wassell ................... 464/20 |
| 5,224,898 A | * | 7/1993 | Johnson et al. ........... 464/20 |
| 5,372,548 A | | 12/1994 | Wohlfeld |

FOREIGN PATENT DOCUMENTS

JP    5-141172    * 8/1993

* cited by examiner

*Primary Examiner*—Lynne H. Browne
*Assistant Examiner*—Aaron Dunwoody
(74) *Attorney, Agent, or Firm*—Mark A. Oathout

(57) ABSTRACT

A torsional shock absorber dampens rotary shock loading on a well drill string. An outer housing has drive splines on an inner surface. A mandrel is located within the outer housing and has drive splines on an outer surface that fit between the drive splines on the inner surface of the housing. Dampening bars are positioned longitudinally between the splines of the outer housing and the splines of the mandrel to absorb shock from non-uniform torsional loading at the drive interface between the outer housing and the mandrel. A balancing piston is located within the tool to compensate for pressure difference between drilling fluid pressure and lubricant contained within the shock absorber. A thrust bearing assembly is provided to accept axial thrust loads from the outer housing and transfers the load to the splined mandrel. A retainer transfers tensile loads from the housing to the mandrel through the thrust bearing.

16 Claims, 4 Drawing Sheets

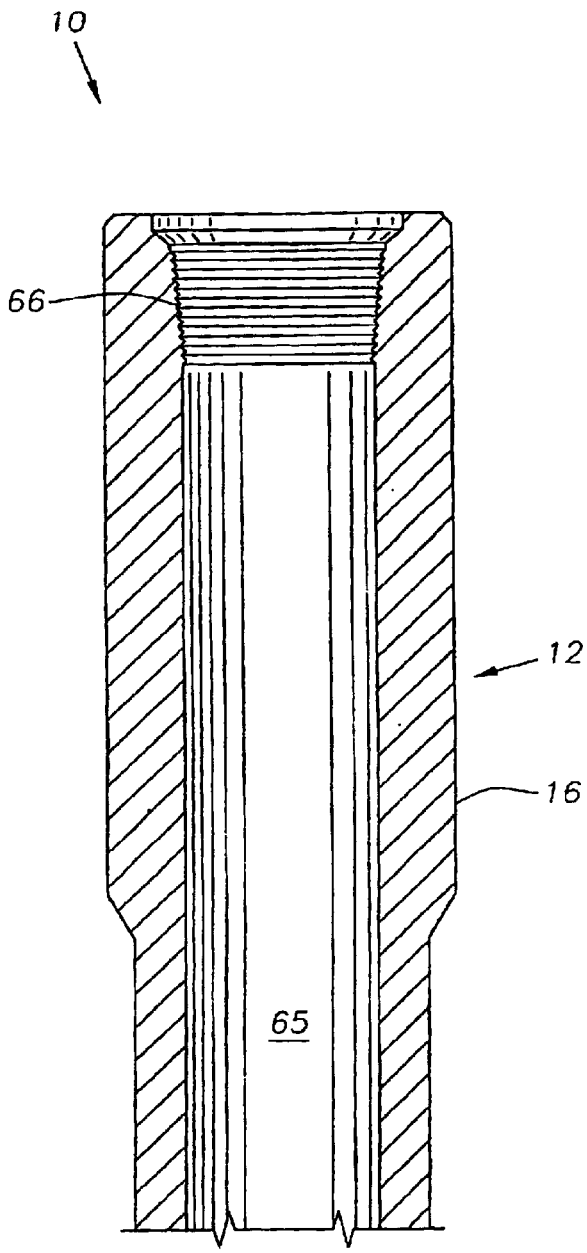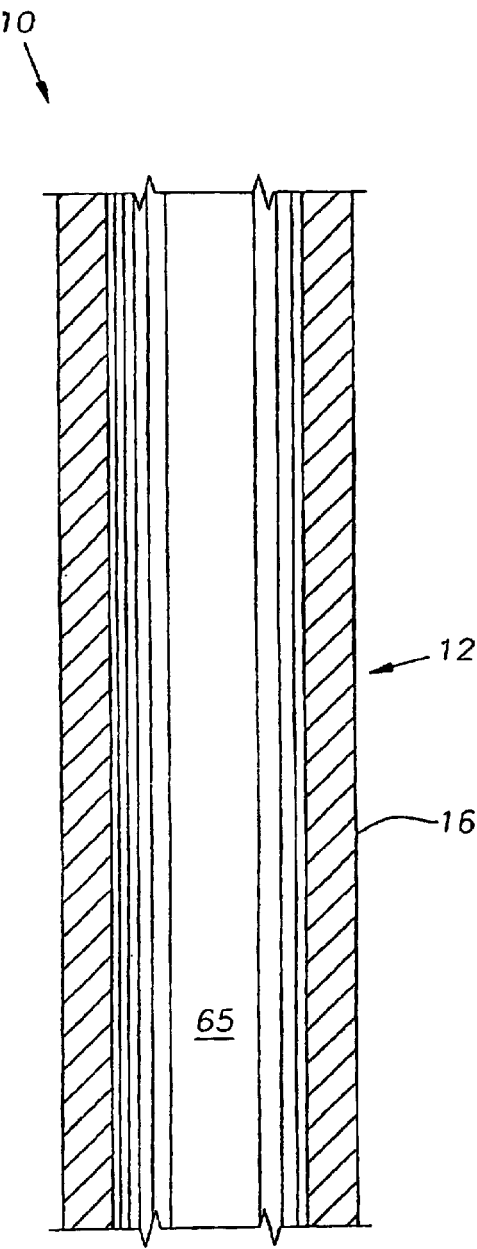
Fig. 1a
Fig. 1b

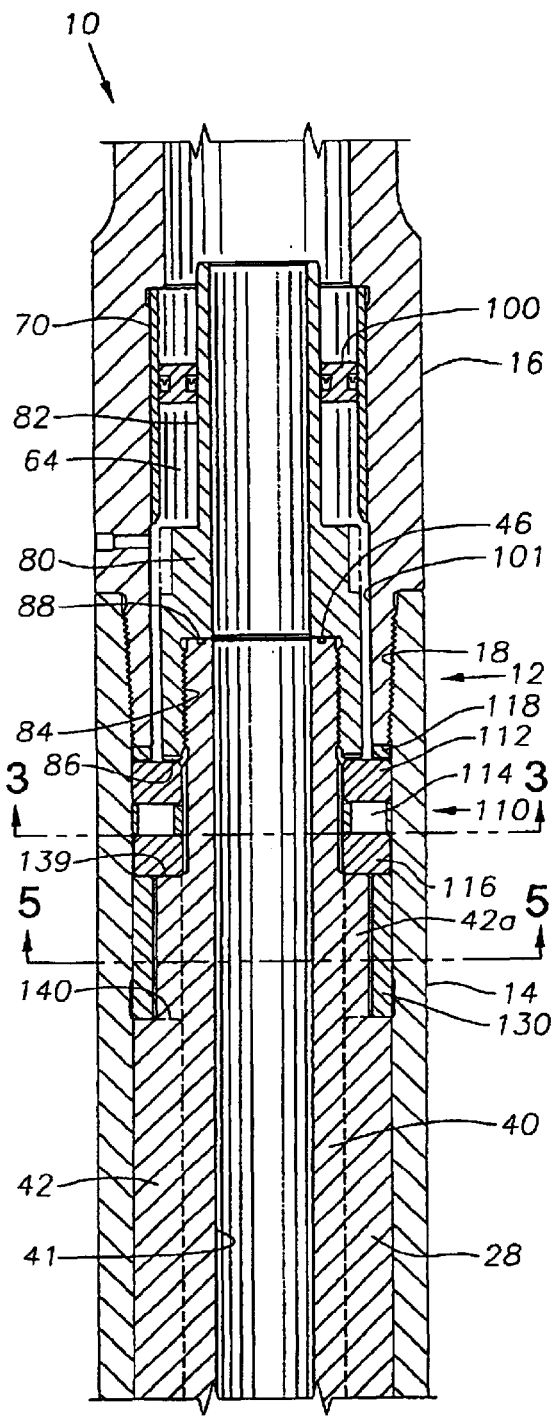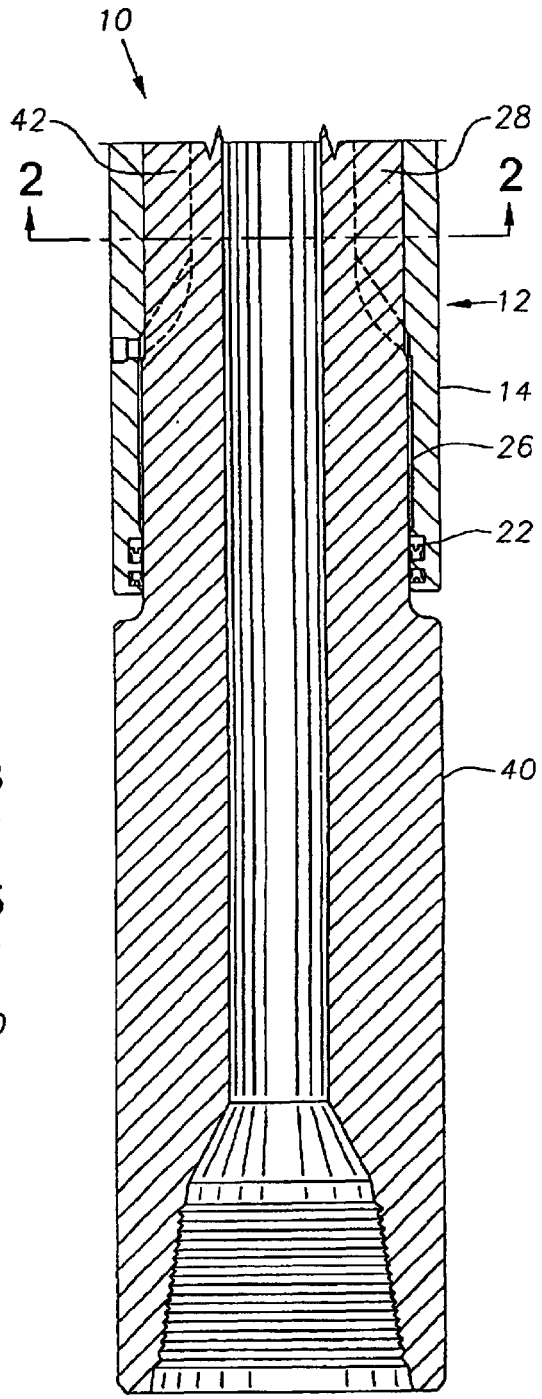
Fig. 1c
Fig. 1d

TORSIONAL SHOCK ABSORBER FOR A DRILL STRING

TECHNICAL FIELD

This invention relates generally to a shock absorber and rotary shock dampening device. More particularly, this invention relates to a device for absorbing and dampening rotary shock loading on drill bits, drill string tubulars or other component assemblies used in rotary drilling applications.

BACKGROUND OF THE INVENTION

In oil drilling applications, energy from a drilling rig's drive assembly is transferred through the drill sting to rotate the drill bit. The drill bit typically encounters many variables in formation consolidation, consistency and compressive strengths. With each change in these variables, and with inconsistencies introduced by bit wear, the resistance to penetration and resultant rotary torque requirements are in constant transition. As a result, torsional energy is either stored in, or drawn from the drill string. Since surface equipment can neither anticipate nor react to these changes, the drill string tubulars are subjected to both resonant vibration and significant random shock loading, which results in premature wear and damage to both the drill string and bit.

When the drill string and bit are experiencing high torque and high pressure, it is desirable to provide a shock absorbing coupling to eliminate rotary shock loading. Other devices have been set forth to eliminate rotary shock loading on a drilling string. However, improvements are desired.

SUMMARY OF THE INVENTION

A torsional shock absorber for dampening rotary shock loading on drill string tubulars and bits is provided. The torsional shock absorber has an outer housing that is made up of a lower splined housing and an upper housing. The lower splined housing connects to the outer piston housing and is fitted with drive splines on an inner surface. A mandrel is located within the outer housing and has drive splines on an outer surface of the mandrel that fit between the drive splines on the inner surface of the lower splined housing. The drive splines of the lower splined housing and the drive spines of the mandrel mesh so that the lower splined housing may deliver rotary energy to the mandrel. Dampening rods are positioned longitudinally between the splines of the upper housing and the splines of the mandrel to absorb shock from non-uniform torsional loading at the drive interface between the upper housing and the mandrel.

The upper housing has a cylindrical bore at its lower end for receiving a sleeve. The piston mandrel is affixed to and is part of the lower splined mandrel. The piston mandrel has an upwardly extending cylindrical section. A balancing piston is located in sealing engagement with an inner surface of the sleeve and with an outer surface of the upwardly extending cylindrical section of the piston mandrel. The balancing piston compensates for pressure variations, such as pressure increases when the drilling rig mud pumps are engaged.

A thrust bearing assembly is provided to accept axial thrust loads from the upper housing and to transfer the load to the splined mandrel. The thrust bearing assembly has an upper thrust race and a roller bearing. The upper and lower thrust races are provided with a flat surface that allows the roller bearing to slidably oscillate as torsional stress is transferred between the upper piston and the splined mandrel. A retainer cooperates with the thrust bearing to transfer tensile forces from the housing through the thrust bearing to the mandrel.

BRIEF DESCRIPTION OF THE DRAWINGS

FIGS. 1a, 1b, 1c, and 1d are an elevational cross-section view of the torsional shock absorber of the invention.

DETAILED DESCRIPTION OF THE INVENTION

Figure 2:
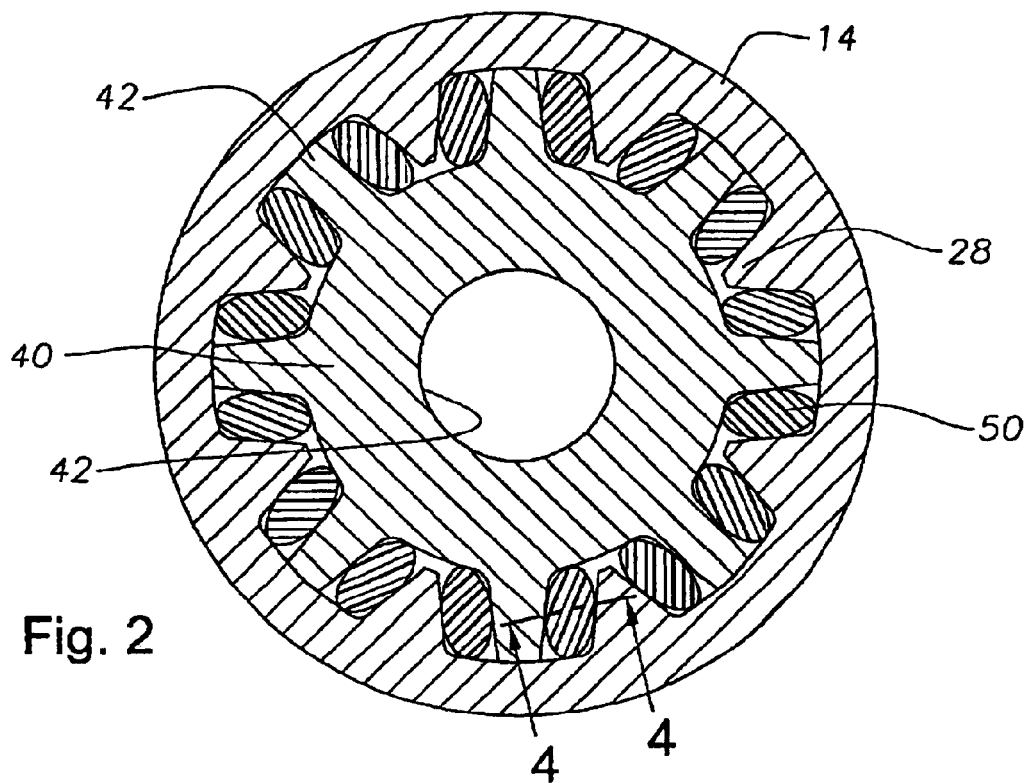
FIG. 2 is a of cross-sectional view of the torsional shock absorber of the invention taken along line 2—2 of FIG. 1d.

Referring now to FIGS. 1 and 2, a torsional shock absorber is designated generally 10. The torsional shock absorber has an outer housing 12 that is made up of a lower splined housing 14 (FIGS. 1c and 1d) and an upper housing 16 (FIGS. 1a–1c). Lower splined housing 14 secures to upper housing 16 by threads 18. Lower splined housing 14 has a seal 22 on a lower end to isolate lubricating fluids within outer housing 12 from drilling fluid in a wellbore annulus. A bushing 26 is located above seals 22. Bush 26 is a thin sleeve that fits between a mandrel 40 and lower housing 14. Seal 22 sealingly engages an exterior portion of mandrel 40. The lower splined housing 14 is formed with internal drive splines 28 (FIGS. 1a, 1b, and 2) that protrude radially inward.

Splined mandrel 40 (FIGS. 1c, 1d, and 2) has an upper portion located within outer housing 12. Splined mandrel 40 has drive splines 42 on an outer surface of splined mandrel 40 above bushing 26. Drive splines 42 fit within spaces between spines 28 and receive rotary energy from drive splines 28 of lower housing 14. Mandrel 40 has an axial bore 41 extending through it.

Splined mandrel 40 has an O-ring 46 located on an upward facing rim. O-ring 46 mates against a smooth surface on downwardly facing internal rim 88 a on piston mandrel 80, which is discussed below. A plurality of dampening bars 50 (FIG. 2) are positioned between splines 28 of lower housing 14 and splines 42 of mandrel 40. In FIG. 2, dampening bars 50 are shown undergoing torsional shock, being squeezed between splines 28 and 42. Dampening bars 50 are placed between splines 28 and 42 to absorb shock from non-uniform torsional loading at the drive interface between the splines 42 of mandrel 40 and splines 28 of lower housing 14. Dampening bars 50 (FIG. 2) are made of elastomeric materials, preferably urethane.

Figure 4:
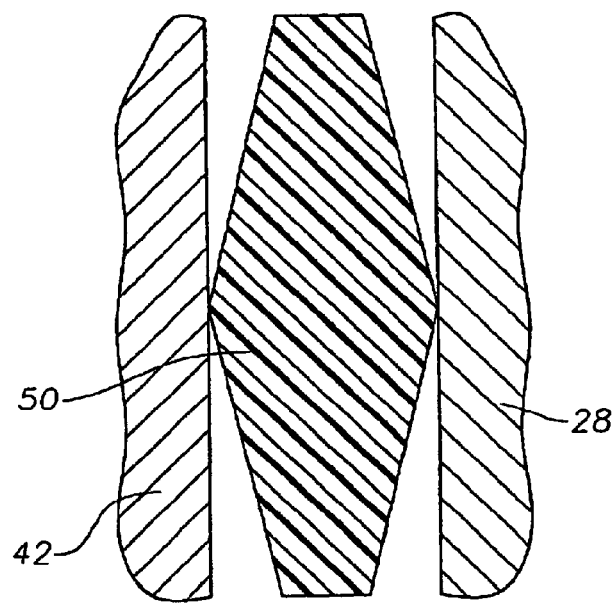
FIG. 4 is a sectional view of a portion of the torsional shock absorber of FIG. 1, taken along the line 4—4 of FIG. 3.

Dampening bars 50 preferably have a cross-sectional shape to effect an exponential spring rate. Preferably, in a side view, as shown in FIG. 4, they are generally co-linear or egg-shaped along their axis, being in the configuration of two frusto-cones inverted relative to one another. The upper portion diverges in a downward direction and the lower portion diverges in an upward direction. This results in a central section that has a greater cross-sectional dimension or diameter than the upper and lower ends. Consequently, light torsional shocks are absorbed by deforming only a central portion, not effecting the upper and lower portions. A severe torsional shock may deform the dampening bars 50 along their entire lengths, including the upper and lower portions. The amount of deformation depends upon the severity of the shock, thus providing a variable spring rate.

Additionally, dampening bars 50 may be provided with various hardness properties as appropriate. In one embodiment, dampening bars 50 of a first hardness may be installed on a drive side of splines 28 and dampening bars 50 of a second hardness may be installed on a return side of splines 28 to further enhance operating characteristics. Alternately, each dampening bar 50 might be made up of two or more materials, each material having a different hardness. Dampening bars 50 may be changed out for different drilling conditions with bars having a greater or lesser hardness or different shapes.

Referring to FIG. 1a, upper housing 16 has threads 66 on an upper end for connection to a drill string. Upper housing 16 also has a central bore or passage 65 extending through it for the passage of drilling fluid. Referring to FIG. 1c, a lubricant chamber 64 is located in upper housing 16 and lower housing 14. A sleeve 70 is positioned within an upper portion of lubricant chamber 64 and forms the side wall. A piston mandrel 80 is affixed to and may be considered a part of splined mandrel 40. Piston mandrel 80 has a threaded section 84 secured to threads on an upper end of splined mandrel 40. Piston mandrel 80 has an upwardly extending cylindrical neck 82 that extends through sleeve 70 and a downward facing shoulder on a lower end 86. Piston mandrel 80 has downwardly facing internal shoulder 88 that mates with O-ring 46 to form a seal with an upper end of splined mandrel 40.

An annular piston 100 is positioned in sealing engagement with an inner surface of sleeve 70 and with an outer surface of upwardly extending cylindrical neck 82 of piston mandrel 80. The upper side of balancing or compensating piston 100 is exposed to pressure in the drill string through passage 65. Chamber 64 is filled with a lubricant below balancing piston 100. Lubricant chamber 64 extends downward through an annular passage 101, through spaces around a thrust bearing 110, through spaces between splines 28, 42 and ends at seal 22 (FIG. 1d). Piston 100 is free to move axially relative to piston mandrel 80 and upper housing 16 to apply the drill string pressure to the lubricant, equalizing lubricant pressure with the drill string drilling fluid pressure when the drilling rig pumps are engaged. Equalizing the lubricant pressure with the drill string pressure improves seal wear by reducing the pressure differential across seal 22.

Figure 3:
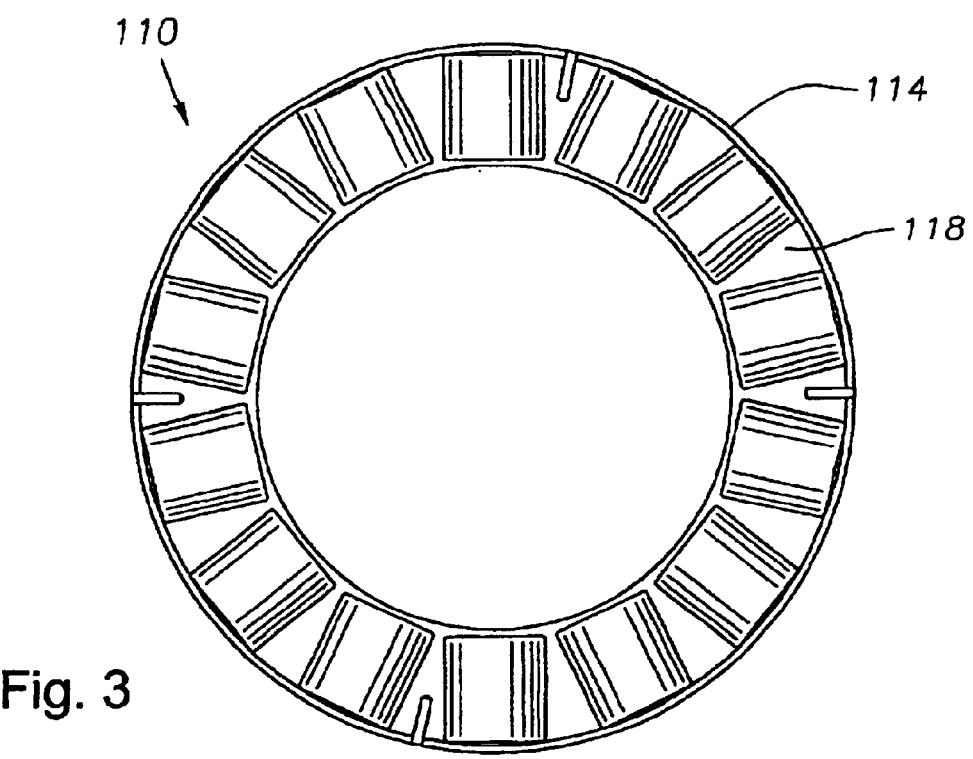
FIG. 3 is a sectional view of the torsional shock absorber of the invention taken along line 3—3 of FIG. 1c.

Thrust bearing 110 (FIG. 1c and 3) is located below the downward facing shoulder 86 of the piston mandrel 80. Thrust bearing 110 consists of an upper race 112, a set of roller bearings 114 and a lower race 116. Upper race 112 engages the downward facing shoulder 86 of piston mandrel 80. Upper race 112 also engages adjusting shims 118 that are located between the lower end of upper housing 16 and upper race 112. Upper thrust race 112 and lower thrust race 116 are preferably constructed of smooth metal and have flat surfaces that allows the roller bearings 114 to rotate as torsional stress is transferred between the upper housing 16 and the splined mandrel 40.

Lower race 116 contacts an upward facing shoulder of mandrel 40, this being upper ends 139 of splines 42. Downward thrust passes from upper housing 16 through shims 18, thrust bearing 110 and into upper ends 139 of mandrel splines 42.

Figure 6:
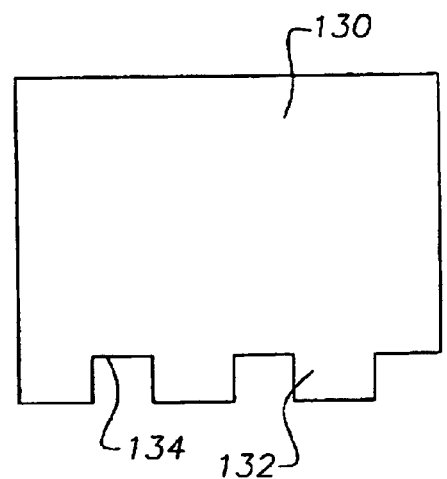
FIG. 6 is a side elevational view of the retainer of the torsional shock absorber of FIG. 1.
Figure 5:
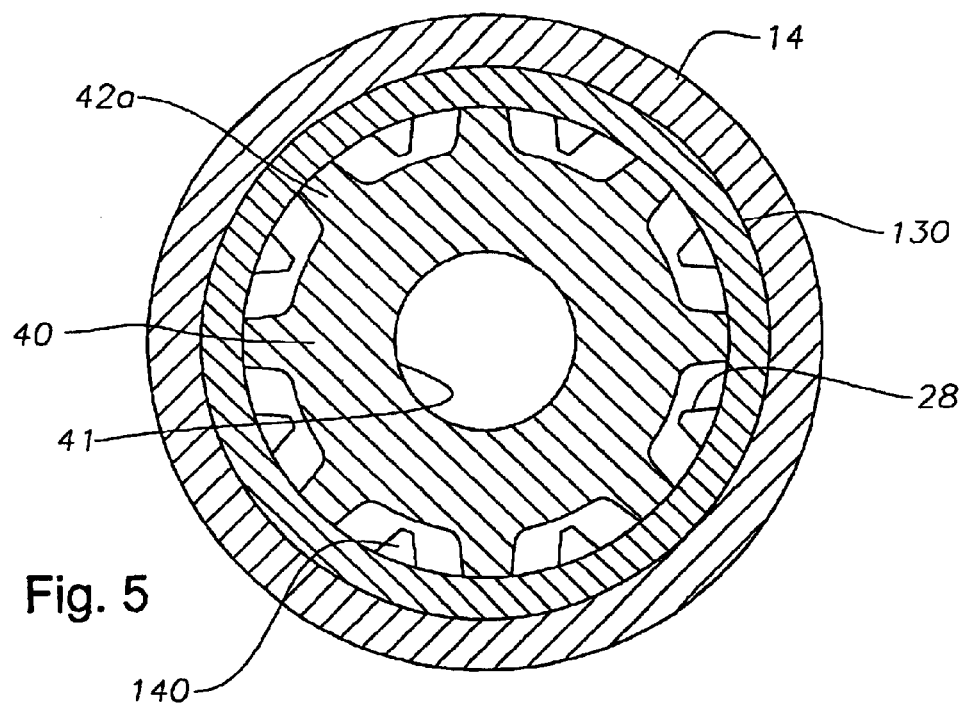
FIG. 5 is a sectional view of the torsional shock absorber of FIG. 1, taken along the line 5—5 of FIG. 1c.

Lower housing 14 also has an internal upward facing shoulder defined by upper ends 140 of splines 28. Upper ends 140 of splines 28 are located a distance below lower race 116 and below upper ends 139 of splines 42. As shown also in FIG. 5, an upper portion 42a of mandrel splines 42 has a lesser radial dimension in the space above upper ends 140 of splines 28 than below. This leaves an annular space between the outer edges of spline upper portion 42a and the smooth internal bore of lower housing 14. A retainer 130 fits in this annular space above splines 28, surrounding spline upper portion 42a, and with its upper end flush with upper ends 139 of mandrel splines 42. Retainer 130 has a cylindrical exterior and a smooth internal bore that slips freely over the outer edges of spline upper portion 42a. AS shown in FIG. 6, retainer 130 has circumferentially spaced lugs 132 or projections on its lower end that fit between upper ends 140 of outer housing splines 28. This locks retainer 130 to outer housing 14 for rotation therewith Downward facing shoulders 134 between lugs 132 contact upper ends 140. Retainer 130 does not engage the drive surfaces of splines 42 of mandrel 40, thus it is free to pivot along with housing 14 relative to mandrel 40 while undergoing torsional shock.

Retainer 130 retains mandrel 40 with outer housing 12 while undergoing tensile stress, such as when the drill string is being lowered into the well and while picking up the drill string. During these occurrences, the weight of the components in the drill string below mandrel 40 transfers from the downward facing shoulder 86 of piston mandrel 80 to thrust bearing 110, through castellated nut 130 and onto upper ends 140 of splines 28 of outer housing 14.

In use, lubricant will be introduced into shock absorber 10 to fill chamber 64 below piston 100, including spaces around piston mandrel 80, spaces in and around thrust bearing 110, spaces around retainer 130, and spaces between splines 42 and 28 down to seal 22. Shock absorber 10 is secured within the drill string above a drill bit. While drilling the drill string experiences spontaneous and harmonic torsional shock during the drilling process as torsional shock absorber 10 is rotated by the drill string. Upper housing 16 is rotated by the drill string. Downward load through the drill string on the drill bit transmits from upper housing 14, through bearing 110 and the upper ends 139 of splines 42 to mandrel 40. The upper ends of dampening bars 50 are spaced below thrust bearing 110, so no thrust is transmitted to them. Rotation is transmitted to lower housing 14 and through dampening bars 50 to mandrel 40 via splines 28, 42 and down to the drill bit Drilling fluid is pumped down the drill pipe and bore 65 in upper housing 16. The drilling fluid flows through bore 41 and is discharged out nozzles in the drill bit. The drilling fluid also acts on the upper side of balancing piston 100, creating a positive pressure on the lubricant in shock absorber 10. This positive pressure reduces the pressure differential across seal 22, because the pressure on the exterior of seal 22 will be less than the pressure on the interior side of seal 22. Torsional shocks are reduced by the elastomeric dampening bars 50. Bearings 110 allow slight relative rotational movement between mandrel 40 and housings 14 and 16 to accommodate torsional shock. Dampening bars 50 reduce damage to drill bits and drill string components by disrupting resonant vibration and dampening spike loading. Since dampening bars 50 are preferably positioned on both sides of each spline 28,42, both induced and reactive loads are dampened. The larger cross-section of the central portion of dampening bars 50 provides an exponential spring rate wherein absorption characteristics increase with shock loads encountered but resonant vibrations are absorbed or transformed to variant, non-destructive loads. The inverted frusto-conical configuration of the dampening bars described above optimizes the tool's ability to disrupt resonant vibrations. Typically, rotational movement between mandrel 40 and housings 14, 16 is less than seven degrees and should not exceed twelve degrees. Rotational movement within the tool is a function of tool diameter, and the configuration and hardness of the dampening bars.

The torsional shock absorber 10 may be used as an instrument protection device (such as measuring while drilling or logging while drilling instruments) to isolate torsional load stresses induced in the drill string from instrumentation components at an anchor point. Orientation concerns related to directional drilling or geo-steering applications are incidental since the maximum deflection in the torsional shock absorber 10 is typically less than ten degrees and the rotating elements are designed to return to their original neutral position after every cycle. Directional orientation measurements are therefore maintained at plus or minus five degrees in dynamic operation and plus or minus one half of a degree in static measurements. Balancing piston 100 compensates for pressure variations such as pressure increase that typically results when the mud pumps are engaged.

The invention has numerous advantages. Advantages include absorption of spontaneous and harmonic torsional shock during the drilling process and the ability to compensate for pressure within the tool, and therefore longer service life. The pressure compensation ability results in improved seal wear within the tool. Various dampening rods may be installed to customize shock absorption rates. The torsional shock absorber of the invention is compatible with directional orientation requirements and may be adapted for multiple uses including drill string protection, drilling rig equipment protection, or instrument protection. The tool reduces drill bit damage and reduces wear on the drill bit. For example, solid head bits with polycrystalline diamond cutters are subject to a condition wherein cutters will engage the formation in an inconsistent manner and momentarily establish a new center of rotation. This results in inconsistent torsional loads on the drill string, slower rates of penetration and excessive wear and damage to the bit. The shock absorber of this invention reduces shock loads resulting from bit whirl, which reduces all damaging and undesirable effects of bit whirl. Additionally, the tool is useful for absorbing resonant vibration, primary force and reactionary shock absorption. An axial shock section may also be incorporated with the unit, if desired.

While the invention has been shown in only one of its forms, it should be apparent to those skilled in the art that it is not so limited, but is susceptible to various changes without departing from the scope of the invention.

What is claimed is:

1. A torsional shock absorber for dampening rotary shock loading on a drill string, comprising:

an outer housing having one end adapted to be connected into the drill string;

the outer housing having drive splines on an inner surface;

a mandrel having one end adapted to be connected into the drill string, the mandrel extending into the outer housing and having drive splines on an outer surface of the mandrel that fit between the drive splines on the outer housing;

a dampening bar positioned between each of the splines of the outer housing and each of the splines of the mandrel, the dampening bars being formed of a material to absorb shock from torsional loading at a drive interface between the splines of the outer housing and the mandrel;

a thrust bearing operably located between the outer housing and the mandrel for transferring axial thrust and tensile loads between the outer housing and the mandrel and avoiding the transfer of thrust to the dampening bars a pair of first shoulders, one on the mandrel and one on the housing, that engage a first side of the thrust bearing:

a pair of second shoulders, one on the mandrel and one on the housing, the second shoulder on the mandrel engaging a second side of the thrust bearing, so that axial thrust passes between the first shoulder on the housing, the thrust bearing and the second shoulder on the mandrel; and an annular retainer surrounding a portion of the mandrel and being rotatable relative to the mandrel, the retainer having a first end that engages the second side of the bearing and a second end that engages the second shoulder of the housing, so that an axial tensile load passes between the housing, through the second shoulder of the housing, the retainer, the thrust bearing, and to the first shoulder of the mandrel.

2. A torsional shock absorber for dampening rotary shock loading on a drill string, comprising:

an outer housing having one end adapted to be connected into the drill string;

the outer housing having drive splines on an inner surface;

a mandrel having one end adapted to be connected into the drill string, the mandrel extending into the outer housing and having drive splines on an outer surface of the mandrel that fit between the drive splines on the outer housing;

a dampening bar positioned between each of the splines of the outer housing and each of the splines of the mandrel, the dampening bars being formed of a material to absorb shock from torsional loading at a drive interface between the splines of the outer housing and the mandrel; a thrust bearing operably located between the outer housing and the mandrel for transferring axial thrust and tensile loads between the outer housing and the mandrel and avoiding the transfer of thrust to the dampening bars;

a pair of downward facing shoulders, one on the mandrel and one on the housing, that engage an upward facing side of the thrust bearing;

an upward facing shoulder on the mandrel engaging a downward facing side of the thrust bearing, so that downward thrust passes from downward facing shoulder on the housing, through the thrust bearing and to the upward facing shoulder on the mandrel;

an annular retainer surrounding a portion of the mandrel and being rotatable relative to the mandrel, the retainer having an upper end that engages the downward facing side of the bearing and a lower end that engages upper ends of the splines in the housing, so that an axial tensile load passes from the housing, through the upper ends of the splines in the housing to the retainer, and from there to the thrust bearing, and to the downward facing shoulder of the mandrel; and wherein the retainer has downward projecting lugs that fit between the upper ends of the splines in the housing for causing the retainer to rotate with the housing.

3. A torsional shock asborber for dampening rotary shock loading on a drill string, comprising:

an outer housing having one end adapted to be connected into the drill string;

the outer housing having drive splines on an inner surface;

a mandrel having one end adapted to be connected into the drill string, the mandrel extending into the outer housing and having drive splines on an outer surface of the mandrel that fit between the drive splines on the outer housing;

a dampening bar positioned between each of the splines of the outer housing and each of the splines of the mandrel, the dampening bars being formed of a material to absorb shock from torsional loading at a drive interface between the splines of the outer housing and the mandrel;

a thrust hearing operably located between the outer housing and the mandrel for transferring axial thrust and tensile loads between the outer housing and the mandrel and avoiding the transfer of thrust to the dampening bars; and wherein the dampening bars positioned between the splines are of a first hardness on a drive side of the splines and of a second hardness on a return side of the splines.

4. A torsional shock absorber for dampening rotary shock loading on a drill string, comprising:

an outer housing having one end adapted to be connected into the drill string;

the outer housing having drive splines on an inner surface;

a mandrel having one end adapted to be connected into the drill string, the mandrel extending into the outer housing and having drive splines on an outer surface of the mandrel that fit between the drive splines on the outer housing;

a dampening bar positioned between each of the splines of the outer housing and each of the splines of the mandrel, the dampening bars being formed of a material to absorb shock from torsional loading at a drive interface between the splines of the outer housing and the mandrel; a thrust bearing operably located between the outer housing and the mandrel for transferring axial thrust and tensile loads between the outer housing and the mandrel and avoiding the transfer of thrust to the dampening bars; and wherein:

the shock absorber has a central passage for transmitting drilling fluid being pumped down the drill string;

the thrust bearing is located within a lubricant-filled chamber within the outer housing; and the shock absorber further comprises a pressure compensator in the housing in communication with the lubricant-filled chamber and with the central passage for reducing pressure differential between the chamber and pressure of the drilling fluid being pumped through the drill string.

5. A torsional shock absorber for dampening rotary shock loading on a drill string, comprising:

an outer housing having one end adapted to be connected into the drill string;

the outer housing having drive splines on an inner surface;

a mandrel having one end adapted to be connected into the drill string, the mandrel extending into the outer housing and having drive splines on an outer surface of the mandrel that fit between the drive splines on the outer housing;

a dampening bar positioned between each of the splines of the outer housing and each of the splines of the mandrel, the dampening bars being formed of a material to absorb shock from torsional loading at a drive interface between the splines of the outer housing and the mandrel;

a thrust bearing operably located between the outer housing and the mandrel for transferring axial thrust and tensile loads between the outer housing and the mandrel and avoiding the transfer of thrust to the dampening bars; and wherein:

the outer housing and mandrel have a central passage for transmitting drilling fluid being pumped down the drill string;

the thrust bearing is located within a lubricant-filled chamber within the outer housing; and the shock absorber further comprises:

a neck extending from the mandrel into the lubricant-filled chamber, the neck containing a portion of the central passage in the mandrel; and an annular axially movable piston having an inner diameter slidingly engaging the neck and an outer diameter engaging a wall of the lubricant-filled chamber, the piston having one side exposed to drilling fluid flowing through the central passage of the housing and another side exposed to lubricant in the lubricant-filled chamber, for equalizing pressure of the lubricant with that of the drilling fluid flowing through the central passage of the housing and the mandrel.

6. A torsional shock absorber for dampening rotary shock loading on a drill string, comprising:

an outer housing having one end adapted to be connected into a drill string;

the outer housing having drive splines on an inner surface;

a mandrel extending into the outer housing and having drive splines on an outer surface of the mandrel that fit between the drive splines in the outer housing, the mandrel having an end adapted to be connected into the drill string;

a dampening bar positioned between each of the splines of the outer housing and each of the splines of the mandrel, the dampening bar being formed of a material to absorb shock from torsional loading at a drive interface between the splines of the outer housing and the mandrel;

a thrust bearing operable located between the outer housing and the mandrel for transferring axial thrust and tensile load between the outer housing and the mandrel;

a seal between the outer housing and the mandrel, defining a chamber that is filled with lubricant, the chamber also containing the thrust bearing;

a central flow passage extending through the outer housing and the mandrel for the flow of drilling fluid from the surface: and a pressure compensator having one side in communication with lubricant in the lubricant-filled chamber and another side adapted to be in contact with the drilling fluid flowing through the central passage to equalize pressure in the lubricant-filled chamber with pressure of the drilling fluid flowing through the central passage.

7. The torsional shock absorber according to claim 6 wherein the pressure compensator comprises an axially movable piston.

8. The torsional shock absorber according to claim 6 further comprising:

a neck surrounding the central flow passage and extending from the mandrel into the chamber; and wherein the pressure compensator comprises:

an annular axially movable piston having an inner diameter engaging the neck and an outer diameter engaging a wall of the lubricant-filled chamber.

9. The torsional shock absorber according to claim 6, wherein the splines of the outer housing and the mandrel are also located in the lubricant-filled chamber.

10. The torsional shock absorber according to claim 6, further comprising:
   a pair of downward facing shoulders, one on the mandrel and one on the housing, that engage an upward facing side of the thrust bearing;
   a pair of upward facing shoulders, one on the mandrel and one on the housing, the upward facing shoulder on the mandrel engaging a downward facing side of the thrust bearing, so that downward thrust passes from the downward facing shoulder on the housing, through the thrust bearing and to the upward facing shoulder on the mandrel; and
   an annular retainer surrounding a portion of the mandrel and being rotatable relative to the mandrel, the retainer having an upper end that engages the downward facing side of the bearing and a lower end that engages the upward facing shoulder of the housing, so that an axial tensile load passes from the housing, through the upward facing shoulder of the housing, the retainer, the thrust bearing, and to the downward facing shoulder of the mandrel.

11. The torsional shock absorber according to claim 6 wherein:
   the thrust bearing comprises a lower thrust race, an upper thrust race and a plurality of roller located between the races.

12. The torsional shock absorber according to claim 6 wherein the dampening bars have at least one larger portion that is larger in cross-sectional dimension than at least one small portion, so that the smaller portion is squeezed between the splines of the mandrel and the outer housing only if the torsional shock reaches a selected level.

13. The torsional shock absorber according to claim 6, wherein:
   each of the dampening bars has upper generally frusto-conical portion that diverges in a downward direction and a generally lower frusto-conical portion that diverges in an upward direction.

14. A method of dampening rotary shock loading on a drill string having a drill bit, comprising the steps of:
   connecting an internally splined housing to an externally splined mandrel, positioning deformable dampening bars between the splines of the housing and the splines of the mandrel, and mounting a thrust bearing between the housing and the mandrel;
   pumping drilling fluid down the drill string to the drill bit via a passage provided in the housing and in the mandrel;
   applying weight to the drill bit by transferring weight of the drill string through the housing, the thrust bearing and the mandrel, and avoiding application of weight on the dampening bars; and
   exponentially absorbing shock from torsional loading with the dampening bars.

15. The method according to claim 14, further comprising lifting the drill string, and transferring weight of the drill string and drill bit below the housing and the mandrel through the housing, the thrust bearing, and the mandrel.

16. A method of dampening rotary shock loading on a drill string having a drill bit, comprising the steps of:
   connecting an internally splined housing to an externally splined mandrel, positioning deformable dampening bars between the splines of the housing and the splines of the mandrel, and mounting a thrust bearing between the housing and the mandrel;
   pumping drilling fluid down the drill string to the drill bit via a passage provided in the housing and in the mandrel;
   placing the thrust bearing and the dampening bars in a lubricant filled chamber;
   reducing a pressure differential between the lubricant filled chamber and the drilling fluid being pumped through the passage in the housing and the mandrel;
   applying weight to the drill bit by transferring weight of the drill string through the housing, the thrust bearing and the mandrel, and avoiding application of weight on the dampening bars; and
   absorbing shock from torsional loading with the dampening bars.

* * * * *